United States Patent [19]

Weimer et al.

[11] Patent Number: 5,340,417
[45] Date of Patent: * Aug. 23, 1994

[54] PROCESS FOR PREPARING SILICON CARBIDE BY CARBOTHERMAL REDUCTION

[75] Inventors: Alan W. Weimer; William G. Moore; William Rafaniello; Raymond P. Roach, all of Midland, Mich.

[73] Assignee: The Dow Chemical Company, Midland, Mich.

[*] Notice: The portion of the term of this patent subsequent to Mar. 2, 2010 has been disclaimed.

[21] Appl. No.: 720,759

[22] PCT Filed: Jan. 11, 1990

[86] PCT No.: PCT/US90/00276

§ 371 Date: Jun. 28, 1991

§ 102(e) Date: Jun. 28, 1991

[87] PCT Pub. No.: WO90/08105

PCT Pub. Date: Jul. 26, 1990

[30] Foreign Application Priority Data

Nov. 1, 1989 [WO] PCT Int'l Appl. .................. PCT/US89/00114

[51] Int. Cl.$^5$ .................................. C01B 31/36
[52] U.S. Cl. ........................ 148/513; 423/346; 501/88
[58] Field of Search ............... 148/513; 423/346, 345; 501/88

[56] References Cited

U.S. PATENT DOCUMENTS

| | | | |
|---|---|---|---|
| 3,271,109 | 9/1966 | Mezey et al. | 23/205 |
| 3,709,981 | 1/1973 | Lee et al. | 423/346 |
| 3,836,356 | 9/1974 | Irani | 75/33 |
| 3,920,446 | 11/1975 | Irani | 75/51 |
| 4,162,167 | 7/1979 | Enomoto et al. | 106/44 |
| 4,217,335 | 8/1980 | Sasaki et al. | 432/345 |
| 4,226,841 | 10/1981 | Komeya et al. | 423/345 |
| 4,283,375 | 8/1981 | Horne, Jr. et al. | 423/345 |
| 4,292,276 | 9/1981 | Enomoto et al. | 422/199 |
| 4,390,504 | 6/1983 | Enomoto et al. | 422/166 |
| 4,410,502 | 10/1983 | Yamaguchi et al. | 423/345 |
| 4,467,042 | 8/1984 | Hatta et al. | 501/88 |
| 4,529,575 | 7/1985 | Enomoto et al. | 423/345 |
| 4,543,240 | 9/1985 | Goldberger | 423/346 |
| 4,690,811 | 9/1987 | Kida et al. | 423/345 |
| 4,702,900 | 10/1987 | Kurachi et al. | 423/345 |
| 4,818,511 | 4/1989 | Nishi et al. | 423/344 |
| 4,839,150 | 6/1989 | Coyle et al. | 423/345 |
| 4,869,886 | 9/1989 | Saiki et al. | 423/346 |
| 5,108,461 | 4/1992 | Ruthner | 23/313 |
| 5,190,737 | 3/1993 | Weimer et al. | 423/345 |

FOREIGN PATENT DOCUMENTS

| | | | |
|---|---|---|---|
| 0000661 | 2/1979 | European Pat. Off. | 423/345 |
| 2162504 | 2/1986 | European Pat. Off. | 31/36 |
| 1283813 | 11/1968 | Fed. Rep. of Germany | 31/36 |
| 2722866 | 5/1977 | Fed. Rep. of Germany | 31/36 |
| 5580713 | 6/1980 | Japan | 31/36 |
| 6126600 | 2/1986 | Japan | 29/62 |
| 488296 | 2/1937 | United Kingdom . | |
| 2076385 | 12/1990 | United Kingdom | 31/36 |
| 8900114 | 1/1989 | World Int. Prop. O. | 31/36 |

OTHER PUBLICATIONS

Acta Chemica Scandinavica A 35, Oxidation of Silicon Carbide in Oxygen and in Water Vapour at 1500° C., 1981, p. 247–254.
Advances in Ceramics, Production of Fine, High--Purity, Beta SiC Powder, 1987, pp. 257–263.
Lee et al., Formation of Silicon Carbide from Rice Hulls, 1975, pp. 195–198.
Communications of the American Ceramic Society, Beta SiC Powders Produced by Carbothermic Reduction of Silica in a High-Temperature Rotary Furnace, 1983, pp. C-111-113.
Derwent Publications, Nc., SiC Manufactured From Silica and Reactive Carbon, GB-031583.
Derwent Publications, Inc., SiC Manfr. Composed of Beta-type crystals, JA-100348 Chemical Abstracts, vol. 99, No. 424969t.

*Primary Examiner*—Donald P. Walsh
*Assistant Examiner*—Anthony R. Chi
*Attorney, Agent, or Firm*—B. J. Tribble; D. R. Howard

[57] ABSTRACT

A process for preparing silicon carbide by carbothermal reduction is disclosed. This process involves rapidly heating a particulate reactive mixture of a silica source and a carbon source to form a product which shows improved uniformity of crystal size. The product of this process can be used to form a densified part.

32 Claims, 6 Drawing Sheets

0.98 μm 0.98 μm

PROCESS FOR PREPARING SILICON CARBIDE BY CARBOTHERMAL REDUCTION

FIELD OF THE INVENTION

The present invention relates to the field of ceramic powders. More particularly, it relates to a process for producing silicon carbide ceramic powders.

BACKGROUND OF THE INVENTION

Silicon carbide is a ceramic material valued mainly for its high resistance to thermal stress and shock and its exceptional corrosion resistance in high temperature oxidizing environments. It has also found extensive use in the abrasives industry because of its hardness and wear resistance.

In general, silicon carbide exists in both an alpha and a beta form. The alpha phase is characterized as hexagonal, but exhibits many modifications or polytypes based upon stacking sequences in the layered structure. The beta phase, in contrast, is cubic. In both of these structures every atom is tetrahedrally surrounded by four atoms of the other species, forming strong near-covalent bonds. Alpha silicon carbide is assumed to be the stable high temperature phase, and cubic beta silicon carbide transforms slowly to the alpha phase above about 1650° C. Various processes produce predominantly one or the other of these silicon carbide morphologies.

A number of methods of manufacturing silicon carbide have been developed. The most widely used, particularly in large-scale manufacturing, is the so-called Acheson process, in which mixtures of silica and carbon, along with a small amount of sawdust and common salt, are heated in large trough-type electric furnaces. A centrally mounted core of graphite and coke through which a large current can pass serves as a heater element. Maximum temperatures reached in this process approach 2700° C.

Many other methods of manufacturing silicon carbide are disclosed in the literature, for example, in M. Yamamoto's survey article, "Present Situation of SiC Powder," *Ceramics*, Vol. 22, No. 1, p. 46 (1987). These methods include, for example: (1) the carbothermal reduction of silica and carbon in an inert atmosphere in a vertical furnace; (2) a direct reaction of silicon powder and fine carbon powder at around 1400° C. in an inert atmosphere; (3) a sol-gel silica/carbon reduction process; and (4) a two-stage synthetic silica/carbon reduction process, which is carried out as a gas phase reaction. The two-stage synthetic silica/carbon reduction process involves synthesis of a homogeneous, high-purity mixture of silica and carbon by a gas phase reaction, followed by synthesis of beta-type silicon carbide by a solid state reaction. This method is described as producing spherical, high-purity products having a narrow particle size distribution without aftertreatments.

The methods involving carbothermal reduction of silica at high temperatures are based on a reaction approximating the following stoichiometric equation:

$$SiO_2 + 3C \rightarrow SiC + 2CO \text{ (gas)} \tag{1}$$

However, it is well-known that the actual reaction mechanism proceeds through the synthesis and subsequent reaction of gaseous silicon monoxide according to the following sequence:

$$SiO_2 + C \rightarrow SiO \text{ (gas)} + CO \text{ (gas)} \tag{2}$$

$$SiO \text{ (gas)} + 2C \rightarrow SiC + CO \text{ (gas)} \tag{3}$$

A part of the SiC may be formed through a side reaction represented by $$2SiO \text{ (gas)} \rightarrow SiO_2 + Si \tag{4}$$

$$Si + C \rightarrow SiC \tag{5}$$

In both cases, silicon monoxide has an important role in the production of silicon carbide. However, a number of problems must first be overcome to produce silicon carbide powder having desirable properties via the above chemistry.

One problem is that, at reaction temperatures above about 1150° C., silicon monoxide is synthesized according to equation (2) above. The rate of synthesis becomes rapid above about 1600° C. This silicon monoxide tends to condense at cool surfaces near the inlet. Thus, any continuous process must overcome silicon monoxide condensation problems associated with the continuous flow of a silica-containing feed precursor into a hot reaction vessel maintained at a reaction temperature above the generation temperature of the silicon monoxide.

Another problem is that, in addition to the silicon monoxide generation noted above, carbon monoxide is also generated in the reaction sequence of equations (2) and (3) above. Removing the carbon monoxide helps to promote the reaction. However, the gaseous silicon monoxide formed together with the carbon monoxide has a high vapor pressure and tends to be swept away and lost from the reaction chamber unless reacted with carbon. Silicon monoxide loss results in a lowered silicon carbide yield.

One way to reduce the loss of the silicon monoxide is contemplated in U.S. Pat. No. 4,292,276 to Enomoto et al. This patent describes an apparatus for a process in which large excesses of carbon are employed in order to capture the gaseous silicon monoxide gas before it can escape. These excesses are in the carbon/silica molar ratio range of 3.2 to 5. Unfortunately, this method results in a reaction product which contains a large excess of carbon and relatively little silicon carbide.

Another invention addressing the problem of silicon monoxide loss is disclosed in U.S. Pat. No. 4,368,181 (Suzuki et al.), which describes a two-step process wherein silicon monoxide gas is first synthesized according to reaction equation (2) above and then captured via condensation at low temperatures. In the second step the captured condensed silicon monoxide is pulverized with carbon and silica and further reacted to form silicon carbide.

Another problem encountered in any continuous silicon carbide producing process is the continuous discharge of condensing fluids through the outlet end of the furnace. It is difficult to prevent the condensation of any remaining gaseous silicon monoxide along the inside walls of the cooling zone in those furnace designs having a specified cooling area. Unless all of the silicon monoxide reacts completely to silicon carbide within the reaction chamber, some will exit the reaction chamber with the carbon monoxide. The result is that silicon monoxide will condense and deposit within the inlet of the cooling zone, again often causing plugging problems and preventing continuous operation.

Still another problem often encountered in preparing silicon carbide, particularly beta silicon carbide, by currently known methods is that uniform, pure product is difficult to achieve. Purity and uniformity of size and morphology have been found to be desirable for powders used to produce many engineered ceramics products because these properties can help to reduce the incidence of failure due to the presence of small cracks or voids that result from incomplete packing of the precursor powders. It has been suggested by E. A. Barringer and H. K. Bowen, in "Formation, Packing and Sintering of Monodispersed $TiO_2$ Powders," *J. Amer. Ceram. Soc.* 65, C-199 (1982), that, in general, an 'ideal' ceramic powder for producing a high quality part should be of high purity and contain particles which are spherical, nonagglomerated and of a relatively uniform particle size ranging from about 0.1 to about 1.0 micrometer in diameter. The uniform and fine powders often densify at lower temperatures, thus representing cost savings in the long run and, because of their optimized packing capability, often producing significantly stronger and thus more reliable parts. In silicon carbide production, however, it has proven difficult to achieve the desired particle size and uniformity.

For example, when silicon carbide powder is manufactured commercially by the so-called "Acheson process" described above, the result is commonly an extremely nonuniform product. This is because the heating rate is slow and the mass of reactants does not heat evenly. Extensive size reduction, classification, and acid leaching of the product are necessary in order to prepare powders suitable for part fabrication. The size reduction, done by milling of some sort, such as attrition milling, is time-consuming and allows introduction of impurities.

Because of these problems, researchers have sought methods of directly producing silicon carbide having the desired particle size range and uniformity. One effective method involves the direct synthesis of these powders from laser-heated gases. For example, R. A. Marra and J. S. Haggerty, in their article, "Synthesis and Characteristics of Ceramic Powders Made from Laser-Heated Gases," *Ceram. Eng. Sci. Proc.* 3, 31 (1982), describe the preparation of silicon carbide powder by driving exothermic reactions involving $SiH_4$. The result is equiaxed, monodispersed powders with particle sizes in the range of from 0.01 to 0.1 micrometer.

Powders having a desirable size and purity level have also been successfully synthesized from radio frequency plasma-heated gases. See, e.g., U.S. Pat. No. 4,266,977 to Steiger. In another gas phase type synthesis process, U.S. Pat. No. 3,346,338 to Latham, Jr., discloses the continuous production of finely-divided silicon carbide by passing a vapor of each reactant into one end of a furnace reaction zone and then recovering from the other end of the reaction zone a finely-divided carbide product.

In general, the laser- or plasma-heating of reactant gases is characterized by almost instantaneous heating rates of reactants, short reaction times (fractions of a second), minimal exposure to high temperatures, and almost instantaneous product cooling rates. The net result of the nearly instantaneous and uniform heating is submicrometer, uniformly sized ceramic particles. However, while gas phase synthesized powders possess many desirable qualities, the powders are relatively expensive to produce because of the inherent low production rate and high cost of the required equipment and gaseous raw materials. Thus, the gas phase routes, while academically intriguing, may encounter serious limitations to commercial use.

Efforts to directly produce uniform, fine powders by less expensive, more commercially practicable means have also included various furnace modifications. In general, these means involve passing solid reactants through a heated, relatively restricted space, containing inert or reaction-compatible gases, at a rate determined by the desired reaction and the need to avoid decomposition of the desired product. For example, vertical tubular reactors having a general configuration suitable for this are described in a number of patents to Matovich (e.g., U.S. Pat. Nos. 3,933,434; 4,042,334; 4,044,117; 4,056,602; 4,057,396; 4,095,974; 4,199,545; and 4,234,543). These reactors have an inlet end, a reaction chamber, and an outlet end, and the reaction chamber is defined as the interior of an envelope of inert fluid which protects the inside tube wall from both the reactants and the products of reaction. Various processes utilizing these reactors are described in these patents, and silicon carbide is suggested as a possible product in, for example, U.S. Pat. No. 3,933,434. However, the properties of the silicon carbide are neither described nor postulated.

U.S. Pat. Nos. 4,162,167, 4,292,276 and 4,529,575 to Enomoto also disclose an apparatus suitable for producing silicon carbide. In this case the product consists mainly of beta-type crystals. The Enomoto apparatus is a vertical-type reaction vessel having an inlet for a starting material, a reaction zone and a closeable outlet for a product in this order. The closeable outlet allows extended reaction times, on the order of hours. When the process is carried out using excess carbon, the result is a product having an average particle size of greater than one micrometer. The particle size distribution is unspecified.

G. C. Wei, in "Beta SiC Powders Produced by Carbothermic Reduction of Silica in a High-Temperature Rotary Furnace," *Communications of the American Ceramic Society*, July 1983, describes another process for producing silicon carbide. The product has a spherical diameter, based on a Brunauer-Emmett-Teller (BET) surface area range, of from 0.3 to 9 micrometers. The particle size distribution is again unspecified.

Finally, U.S. Pat. No. 4,368,181 to Suzuki et al describes a method of producing inexpensive beta-type silicon carbide by reacting silica having a particle size of less than 150 micrometers and carbon having a particle size of less than 60 micrometers at a temperature below 1650° C. The silicon monoxide formed during the reaction is then contacted again with unreacted carbon to increase the yield. The resulting product is described as consisting mainly of particles having a size of 0.04 to 0.08 micrometers, in the case of a reaction temperature of about 1450° C., and 0.1 to 0.3 micrometer, in the case of a reaction temperature of about 1600° C. Particle size distribution is unspecified.

Thus, it would be desirable in the art to develop a continuous method of producing uniform, fine silicon carbide powders, which reduces or avoids the problems described above and which results in a uniform, high-purity product of a desirable size range and particle size distribution.

SUMMARY OF THE INVENTION

Accordingly, the present invention provides a process for preparing silicon carbide by carbothermal reduction comprising passing a particulate reactive mixture of a silica source and a carbon source through a heating zone such that substantially all of the particles of the reactive mixture are individually heated at a heating rate of at least about 100° C./second to a sufficient temperature and for a sufficient length of time to form a product which, after removal of at least a portion of excess carbon and oxygen, is at least about 80 weight percent silicon carbide crystals which have a size distribution such that at least about 50 weight percent of the silicon carbide crystals is from about 0.4 to about 1.6 times the median crystal size.

In another embodiment the present invention provides a process for preparing silicon carbide by carbothermal reduction which comprises passing a particulate reactive mixture of a silica source and a carbon source through a heating zone such that substantially all of the particles of the reactive mixture are individually heated at a heating rate of from 100° C. per second to 100,000° C. per second to a temperature within a range of from 1400° C. to 2400° C. for and maintained within that range for a time period of from 0.2 to 10 seconds to form a product which, after removal of at least a portion of excess carbon and oxygen, is at least 80 weight percent silicon carbide crystals which have a size distribution such that at least 50 weight percent of the silicon carbide crystals is from 0.4 to 1.6 times the median crystal size.

In another embodiment the process of the present invention can be carried out to produce a composition which, after removal of at least a portion of excess carbon and oxygen, is at least about 80 weight percent silicon carbide crystals such that at least about 50 weight percent of the silicon carbide crystals is from about 0.1 micrometer to about 0.4 micrometer in diameter.

Additional aspects of the present invention include a composition which, after removal of at least a portion of excess carbon and oxygen, is at least about 80 weight percent silicon carbide crystals having a size distribution such that at least about 80 weight percent of the silicon carbide crystals are from about 0.1 micrometer to about 0.4 micrometer in diameter and at least about 50 percent of the silicon carbide crystals are from about 0.4 to about 1.6 times the median crystal size. A densified part produced from this composition is also encompassed.

In still another embodiment the present invention provides a process for preparing silicon carbide crystals by carbothermal reduction which comprises (1) passing a particulate reactive mixture of a silica source and a carbon source into a reactor having (a) a reactant transport member, the reactant transport member having a wall defining a hollow conduit, the wall having a cooling means and being further characterized as having a concentric inner wall defining an inner annular space, the inner annular space having an inlet and being open at the bottom such that a gas can be flowed therethrough; (b) a reactor chamber, the reactor chamber having a wall defining a reaction zone, the chamber being in fluid communication with the reactant transport member; (c) a heating means, the heating means being suitable for heating the particulate reactive mixture in the reaction zone; and (d) a cooling chamber, the cooling chamber having a wall defining a cooling zone, the wall having a cooling means, the cooling chamber being in fluid communication with the reactor chamber; the temperatures of the reactant transport member, reactor chamber, and cooling chamber being independently controllable; such that the particulate reactive mixture can be fed continuously through the reactant transport member into the reactor zone and then into the cooling zone; (2) heating the silica source and the carbon source in the reaction zone at a heating rate of at least about 100° C./second to a temperature within a range of from about 1400° C. to about 2400° C. to form a product aerosol: and (3) cooling the product aerosol in the cooling zone to form a product which, after removal of at least a portion of excess carbon and oxygen, is at least about 80 weight percent silicon carbide crystals which have a size distribution such that at least about 50 weight percent of the silicon carbide crystals is from about 0.4 to about 1.6 times the median crystal size. The product aerosol suitably contains product particles or crystals and any volatile materials such as gaseous silicon monoxide and gaseous carbon monoxide.

The embodiments of the present invention thus provide a process for manufacturing fine silicon carbide ceramic crystals by rapid carbothermal reduction. The properties of the final product preferably include a narrow size distribution. Difficulties normally encountered with gaseous silicon monoxide losses during reaction are reduced.

DESCRIPTION OF THE PREFERRED EMBODIMENTS

Figure 1:
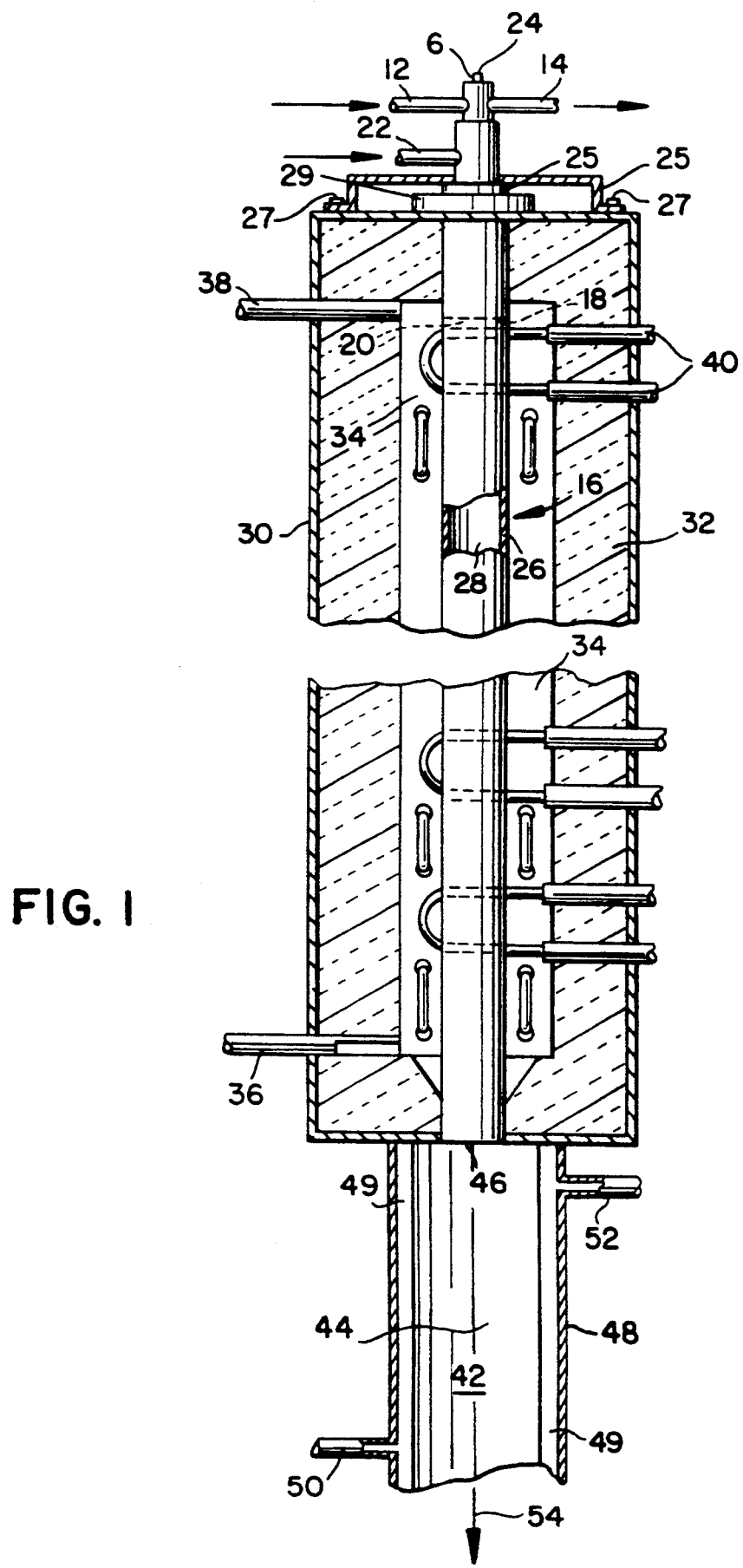
FIG. 1 is a plan view in cross-section of one embodiment of a reactor apparatus by which the present process can be carried out, illustrating with arrows the path of the reactants and product.

In general the present invention is a process by which silicon carbide ceramic crystals can be prepared. The silicon carbide crystals of the present invention are produced by passing a particulate reactive mixture of a silica source and a carbon source through a heating zone such that substantially all of the particles of the reactive mixture are separately and individually heated at a very rapid rate. "Substantially all" herein means at least about 75 percent of the particulate reactive mixture, and more preferably at least about 95 weight percent. The silicon carbide ceramic powders produced thereby are preferably uniform and substantially pure, as described below.

The term "Martin's diameter" refers to the distance between opposite sides of an irregular particle, measured crosswise of the particle and on a line bisecting the projected area. The diameters are measured in a direction parallel to the bottom of a transmission electron micrograph (TEM). The term is more fully explained by Richard D. Cadle in Particle Size, Theory and Industrial Applications, pages 2–4 (1965), the teachings of which are incorporated herein by reference.

The term "coefficient of variation" refers to the ratio of a standard deviation to the mean value from which the standard deviation is measured. By way of illustration, a standard deviation of 0.6 and a mean value of 1 provide a coefficient of variation of 0.6.

The starting silica source is preferably silica, and can be, for example, amorphous granular silica; a fumed silica such as that sold under the trade name CABO-SIL*; a fine liquid dispersed colloid such as an aqueous colloidal silica; a silica gel; precipitated silica; a mixture thereof; or the like.

*CABOSIL is a trademark of Cabot Corp.

The carbon source is desirably selected from the group consisting of forms of carbon, such as carbon black and acetylene carbon black; a hydrocarbon, defined as a compound containing carbon and hydrogen, including, for example, straight and branched chain alkyl compounds having 1 to 100 carbon atoms and cyclic compounds including alicyclic, aromatic, and heterocyclic compounds; a carbohydrate, including, for example, a complex or simple carbohydrate such as a sugar, for example, sucrose; a starch, for example, cornstarch; or a cellulose; another carbon-containing compound, such as vinylidene chloride polymer and other polymers capable of forming a carbon residue on thermal decomposition; or a mixture thereof. Although the carbon sources listed above can be reacted as is, they are preferably calcined, either before or after admixture with the silica source, before the reactive mixture is introduced into the heating zone. The carbon source is preferably acetylene carbon black or some other form of carbon having a purity, in terms of metals, mean Martin's diameter and particle size distribution approximating that of acetylene carbon black.

All of the above sources are commercially available. Other reactants can also be employed within the scope of the invention.

The carbon and silica starting sources together form a particulate reactive mixture. It is preferred that the silica source and carbon source are finely divided and intimately mixed. "Finely divided" means that it is preferred that the particle size of the particulate reactive mixture is less than about 200 micrometers, more preferably less than about 100 micrometers, and most preferably less than about 50 micrometers. The degree of mixing of the particulate reactive mixture generally affects the kinetics of the reaction and therefore the quality of the final product. It is preferred that the mixture be as intimately mixed as possible, preferably by a method such as by spray drying a very fine dispersion of the silica source and the carbon source. Physical mixing is also possible, using methods such as, for example, ball milling. It is also possible to use a single source to supply both the silica and the carbon. One such intimate combined carbon and silica source is coked rice hulls.

It is also desirable if the carbon to silica mole ratio of the particulate reactive mixture is less than 3.5, preferably from about 3.0 to less than 3.2, more preferably from about 3.0 to about 3.1, and most preferably about 3.0. This ratio helps to reduce the presence of unreacted carbon in the product, and thus contributes to product purity.

Once the starting materials are combined to form a preferably uniform particulate reactive mixture, the mixture is rapidly reacted at a sufficient temperature and for a sufficient time to form a product aerosol by carbothermal reduction. This generally involves heating the reactive mixture in a heating zone. The rate of heating in part controls the characteristics of the final silicon carbide crystal product. A rapid heating rate is used to instigate a rapid reaction rate. The heating rate is preferably greater than about 100° C. per second, more preferably greater than about 500° C. per second, and more preferably still, greater than about 1000° C. per second. The rate is still more preferably from about 1,000° C. to 100,000° C., and most preferably from about 10,000° C. per second to about 100,000° C. per second. The sufficient reaction temperature is desirably greater than about 1400° C., preferably from about 1600° C. to about 2400° C., more preferably from about 1800° C. to about 2200° C. and most preferably from about 1800° C. to about 2100° C. At these temperatures and heating rates, the silicon carbide tends to be synthesized rapidly as part or all of a product aerosol. Sufficient time for the reaction is preferably on the order of less than two seconds, and more preferably less than one second. The aerosol can then be cooled to form a product as defined.

The silicon carbide produced hereby preferably tends to be organized more predominantly in its beta-, rather than alpha-, form. This product is preferably uniform, preferably having silicon carbide crystals with diameters of less than about 5 micrometers, more preferably less than about 2 micrometers, still more preferably less than about 1 micrometer, and most preferably from about 0.1 micrometer to about 0.4 micrometer. Preferably at least about 25 percent by weight of the product crystals are less than one micrometer, more preferably at least about 75 percent and most preferably 100 percent. The product, after removal of at least a portion of excess carbon and silica, is also preferably at least about 80 percent by weight silicon carbide, more preferably at least about 90 percent by weight, and most preferably at least about 95 percent by weight. Amounts of excess carbon, silica, silicon monoxide, or mixtures thereof, are preferably less than about 20 percent by weight, more preferably less than about 10 percent by weight and most preferably less than about 5 percent by weight. It is also preferred that the product be stoichiometric silicon carbide. The size distribution of the silicon carbide crystals is preferably such that at least about 50 percent are in the range from about 0.4 times the median crystal size to about 1.6 times the median crystal size. More preferably at least about 80 percent are within this distribution range.

Peter T. B. Shaffer et al., in "Production of Fine, High-Purity, Beta SiC Powder", *Advances in Ceramics,* Vol. 21, pages 257–263 (1987), disclose three post furnace treatments to reduce excess carbon and oxygen contents. They first crush the crude product then oxidize it for a few minutes at 750° C. or below to remove unreacted carbon. They then deagglomerate the oxidized SiC powder using an attrition mill with steel media and an inert halocarbon. After completing the milling and allowing the halocarbon to evaporate, the resulting powder is washed twice with 10% hydrochloric acid, twice with concentrated hydrofluoric acid and once with ethanol before it is dried to yield the final product. The teachings of this reference are incorporated herein by reference.

Hakon Cappelen et al., in "Oxidation of Silicon Carbide in Oxygen and in Water Vapour at 1500° C.", *Acta Chemica Scandinavica A*35, pages 247–254 (1981), suggest that heating in a flowing inert gas enhances removal of surface silica from silicon carbide. The teachings of this reference are incorporated herein by reference.

It has been discovered that four factors have a significant impact upon the mean Martin's diameter, the coefficient of variation and the BET surface area of the resultant silicon carbide crystals. The factors are: mean Martin's diameter of the starting carbon; purity of the starting carbon; reaction temperature; and reaction time. Other factors, such as mean Martin's diameter of the starting silica, have a much smaller effect upon the resultant silicon carbide crystals.

Control of mean crystal size and size distribution of the resultant silicon carbide crystals is very beneficial. Such control allows one to tailor the green density of a silicon carbide part before it is fired. Since green density influences, in turn, part shrinkage and fired density of the part, such control significantly influences the ability to fabricate quality parts.

The ability to obtain "fine" silicon carbide crystals, e.g., those having a mean Martin's diameter of less than or equal to 0.5 micrometer, without milling, attriting, comminuting or deagglomerating eliminates the inadvertent contamination inherent in such procedures. It also simplifies the procedure. In addition, higher surface areas result in a higher quality, more dense part when these fine silicon carbide crystals are pressureless sintered.

In view of the foregoing, the carbon source is preferably acetylene carbon black or another carbon form of similar purity, size and size distribution, with a mean Martin's diameter of less than one micrometer, more preferably within a range of 0.02 to 0.08 micrometers, both ends included, and with substantially all of the carbon having a Martin's diameter of less than 0.4 micrometer; the reaction temperature is desirably within a range of 1800° C. to 2200° C., preferably 1800° C. to 2100° C.; and the reaction time is suitably within a range of 0.2 to ten seconds, desirably within a range of 0.2 to five seconds and preferably within a range of 0.2 to three seconds. By suitable selection of these parameters, silicon carbide crystals prepared in accordance with the present invention have a mean Martin's diameter of less than 0.25 micrometer, a coefficient of variation of 0.6 or less, and an unmilled BET surface area of less than or equal to 30 m$^2$/g, beneficially less than 18 m$^2$/g and desirably from 12 to 18 m$^2$/g. The mean Martin's diameter is desirably within a range of 0.06 to 0.18 micrometers, both ends included. The coefficient of variation is desirably within a range of 0.2 to 0.6 inclusive. Particularly preferred silicon carbide crystals also have a maximum Martin's diameter of 0.5 micrometer.

The silicon carbide product of the present invention can preferably be prepared in a reactor apparatus having a heating zone and, more preferably, also a cooling zone. One such apparatus is described with reference to the FIGS. 1 and 2. This reactor apparatus is preferably a vertical-type reactor in which starting reactants can be rapidly heated to react them to form a reaction product which is then rapidly cooled and continuously removed therefrom. The reactor's design helps to eliminate problems which can occur near either the inlet or outlet ends. At these locations silica or silicon monoxide may contact the reactor internal surfaces. Since the temperature may be such that gaseous silicon monoxide is cooled and condenses, plugging can result from improper design, operation or both.

Figure 2:
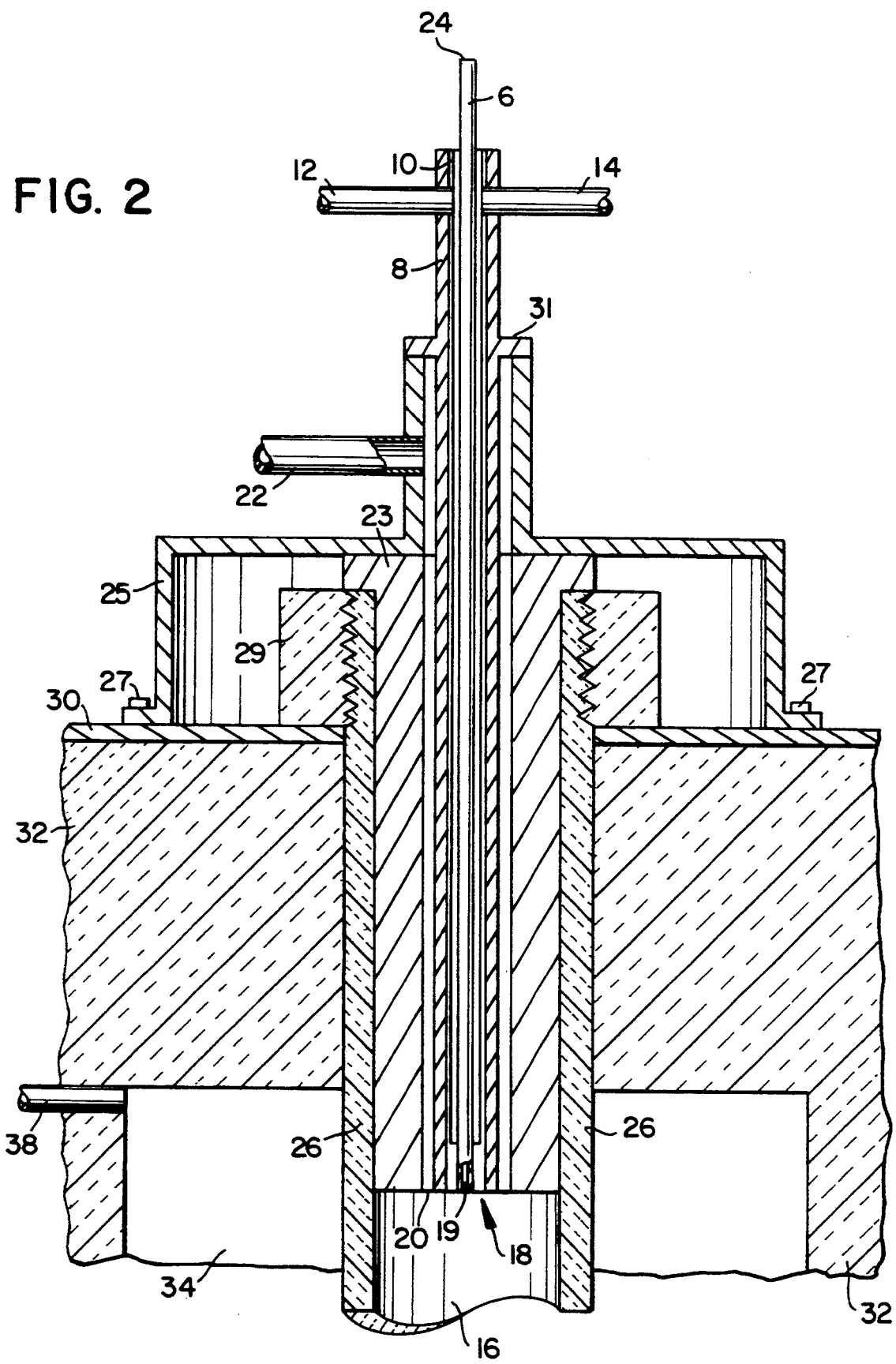
FIG. 2 is a plan view in cross-section of the cooled reactant transport member of the reactor apparatus of FIG. 1.

A design modification particularly directed to the reduction of plugging problems at the inlet end involves the cooled reactant transport member. Referring to FIGS. 1 and 2, the reactant transport member 6 comprises a wall defining a conduit for injecting reactants. This member 6 can be cylindrical, rectangular, or of other effective configuration. The member 6 is preferably constructed of copper, which exhibits the desired thermal conductivity and which allows for placement of at least its tip directly within the radiating reactor chamber 16. Preferably a short length of it can be placed directly within the radiating reactor chamber 16. Other conductive materials can also be used. The reactant transport member 6 is cooled, preferably with cold water flowing through a cooling jacket 8. The jacket is preferably baffled by baffle 10 with coolant flowing in through a coolant inlet 12 and out through a coolant outlet 14. Other suitable heat transfer systems can also be used.

This reactant transport member 6 is arranged in fluid connection with the reactor chamber 16 such that near the transport member exit 19 there is a gas-flow space 20 defined along the perimeter of the cooled member, i.e., outside of the cooling jacket or other heat transfer system, and in communication with the reactor chamber 16. In one preferred embodiment of the present invention there is one cooled reactant transport member 6 in communication with the reactor chamber 16. In another preferred embodiment there are a plurality of reactant transport members 6 in communication with the reactor chamber 16, to enable uniform, evenly dispersed introduction of feed into the reactor chamber 16. The gas-flow space 20 is at some point in fluid communication with a sweep gas inlet 22, and is preferably open along its entire lower limit to allow sweep gas to exit into the reactor chamber 16. Thus, the gas-flow space 20 can preferably describe an annular region. The sweep gas inlet 22 can be constructed such that it is part of a support sleeve 25, which can be secured to outer shell 30 by bolts or other fasteners 27 at one end and which is preferably sealed by gasket or other sealing means 31 at the opposite end to help to ensure a gastight seal. Plug 23, preferably made of graphite, forms a substantial portion of the upper surface of the reactor chamber. The reactant transport member 6 further comprises an inlet opening 24.

Reactor chamber 16 comprises a reactor wall 26 which is preferably constructed of graphite. Other refractory materials, such as, for example, other carbonaceous materials, can also be used. The reactor wall 26 is preferably supported by being connected to an internally screw-threaded bushing 29. This wall defines a reaction zone 28. Preferably concentric with reactor wall 26 is an outer shell 30. The outer shell 30 serves to shield the environment from the extremely high temperatures, preferably above about 1400° C., which will be used in the reaction zone 28. The outer shell 30 preferably encloses a layer 32 of an insulating material, and is cooled using an appropriate means such as a water-cooling system. In one embodiment of the present invention there is also a gas plenum region 34, disposed between the reactor wall 26 and the outer shell 30. This gas plenum region 34 is also in fluid communication with plenum gas inlet 36 and plenum gas outlet 38.

Located proximate to the reactor chamber 16 and its enclosed reaction zone 28 is a heating means 40. In the embodiment of FIG. 1, the heating means 40 is a group of heating elements or electrodes located outside of the reaction zone. The heating means is suitable to heat the reactor wall 26, which can then radiate heat to raise the temperature of the contents of the reaction zone 28 to a desired reaction temperature. The electrodes are preferably graphite and can be disposed vertically or horizontally. They can be of any shape, including, for example, hairpin and linear rod configurations. Direct or inductive heating of the reactor wall 26 by electrical resistance using an appropriate source of electricity is also possible. It is preferred that the heating means be disposed such that, in particular, the area of the reaction zone 28 directly proximate to the reactant transport member 6 can be maintained at a desired reaction temperature. This helps to ensure very rapid radiant heating of the reactants as they pass from the reactant transport member 6 into the reaction zone 28.

At the opposite end of the apparatus from the reactant transport member 6 is a cooling chamber 42. The cooling chamber 42 comprises a cooling zone 44 which communicates with the reaction zone 28 by means of a cooling inlet 46. The cooling chamber 42 is preferably configured such that its diameter is larger than the diameter of a cooling inlet 46 disposed between the reaction zone 28 and the cooling zone 44. Diameter is defined to mean the greatest distance across a given cross-sectional area, and thus can refer to the greatest distance across a circular or elliptical cross-section, or the diagonal length of a rectangular cross-section. It is preferred that the cooling inlet 46 is of approximately the same diameter as the reaction chamber 16; however, it is also possible for the cooling inlet to be constricted relative to the reaction chamber 16. Where there is no constriction, it is thus inherent that the cooling chamber preferably has a diameter that is larger than the diameter of the reactor chamber 16, and where there is a constriction the cooling chamber 42 preferably has a diameter as defined that is larger than the diameter of the cooling inlet 46.

Like the reactant transport member 6 and the reactor chamber 16, the cooling chamber 42 can be essentially cylindrical, elliptical, rectangular, or of other effective configuration. It comprises a cooling wall 48 which allows for maintenance of temperatures below about 350° C., preferably below 100° C. and most preferably below 50° C. in the cooling zone. Thus, the use of an appropriate water-cooling jacket or other cooling system is effective and can be incorporated into the apparatus, or applied externally, as desired, with coolant flowing into coolant area 49 through a coolant inlet 50 and out through a coolant outlet 52. It is also within the scope of the present invention to employ other cooling means known to those skilled in the art, including, for example, cool gas quenching systems. The selected means thus is any means suitable to allow for very rapid cooling of the product powder as it exits from the reaction chamber.

Finally, the apparatus of the embodiment of FIG. 1 has an exit 54 at its opposite extreme from the reactant transport member 6. The exit 54 can preferably be in fluid communication with a collection device (not shown), such as a cyclone or bag filter, in which the final product of the reaction can be collected for further processing as desired.

The method in which the apparatus described above can be used for preparing silicon carbide, including but not limited to the apparatus described in the embodiment illustrated by FIG. 1 and FIG. 2, will be described in detail. The reactants used for illustrative purposes herein will be silica and carbon black.

The particulate reactive mixture of silica and carbon black is preferably first prepared. This reactive mixture can be prepared by physically blending the solid reactants or by other means such as drying a liquid solution containing the reactants on the surface of a rotating drum or within a dryer. The reactive mixture particles preferably have a diameter of less than about 150 micrometers, more preferably less than about 100 micrometers, and most preferably less than about 50 micrometers. This is because larger particles or aggregates will tend to fall through the reaction zone having only their surfaces reacted. Milling or grinding of the reactive mixture particles may be necessary in order to achieve desired particle size. The desired particle size can thus be attained with the use of jet mills, ball mills, attrition mills, hammer mills, or any other suitable device. Dispersers such as opposing jets, centrifugal fans and the like can also be employed to break up any agglomerates present in the particulate reactive mixture prior to its introduction into the reaction zone. It is also possible to directly spray dry a liquid solution, slurry or gel of the reactants in order to achieve the desired reactive mixture particle size. The spray dried solution can incorporate water or, in some cases, an appropriate organic material as a solvent. A binder can be included if desired to aid in forming the reactive mixture.

The reactive mixture is preferably introduced using a feeder system that produces as uniform a flow of the mixture as possible. Various applicable feeders, such as twin screw feeders, star valves, slow speed screw feeders, venturi feeders, and the like, as well as modifications thereof, will be known to the skilled artisan. The feeder is desirably a twin screw feeder.

The particles of the reactive mixture, preferably silica and carbon, are preferably entrained in a gas, which can be either an inert gas, such as argon or another noble gas, or a gas which is compatible with the desired reaction, i.e., which either serves as a reactant or is the same as that produced as a reaction by-product. For example, argon, helium, nitrogen or hydrogen can preferably be used, with argon being more preferred. Hydrogen may be particularly compatible since water in the reactive mixture will react with the carbon to produce carbon monoxide and hydrogen.

The entrained particles are then introduced into the reactant transport member 6 via the inlet opening 24. The gas serves as a carrier to move the particles through the apparatus. In a preferred embodiment the apparatus is positioned vertically, with the reactant transport member 6 at the top and the cooling chamber 42 at the bottom. In this orientation gravity also assists in moving the particles. However, the apparatus can be used in alternative positions, e.g., horizontally, as long as there is sufficient entrainment gas velocity to ensure continuous movement of the particles through the reactor at a sufficient rate.

At the same time a sweep gas, which is again preferably either an inert gas or a reaction-compatible gas, is passed through gas-flow space 20, where it tends to inhibit contact of any entrained solid, liquid or vapor portions of the reactive mixture with upper reactor chamber surface 18, which is the surface of plug 23 and any surfaces near the juncture between the reactant transport member outlet 19 and the reaction zone 28. These surfaces may be at a temperature below the reaction temperature, which is preferably at least about 1400° C. Where silica is used as a reactant it could result in the formation of gaseous silicon monoxide in the temperature range above about 1150° C., which, without the gas-flow space, could tend to condense and cause plugging at the cooler sites. This could, in turn, result in the formation of large agglomerated particles which could pass through the reaction zone and, upon collection as product, contain incompletely converted inner cores of reactant. The reactor design described herein circumvents or reduces this problem.

The sweep gas continues out into the reaction zone 28, where it mixes with the entraining gas and reactant particles. Because of the action of the cooling apparatus or system, such as cooling jacket 8, the temperature in the reactant transport member 6 is preferably less than about 350° C., more preferably less than about 100° C., and most preferably less than about 50° C. Concurrently, a gas is introduced into the gas plenum region 34 exterior of the reactor chamber 16. This gas can preferably be independently selected from the same selection of gases as the sweep gas. For example, in some cases it may be desirable to use nitrogen as the purge gas, whether or not it is also used as the sweep or entrainment gas, because of nitrogen's electrical properties. However, in cases where a nitrogen-containing product is unacceptable it would be advisable to ensure that the nitrogen does not have access to the reactor chamber. One way to accomplish this is to maintain the gas in this region at an equilibrium or even negative pressure. This would be particularly advisable because of the porosity of the preferably graphite reactor wall 26, as well as potential leakage around construction joints. In other cases, it may alternatively be desirable to employ a positive gas pressure in gas region 34, to help to prevent escape of entrainment or sweep gas and reactant/product particles from the reactor chamber.

There is a significant temperature demarcation between the end of the reactants' pathway through the reactant transport member 6 and the entrance into the reaction zone 28. This temperature demarcation is preferably extremely sharp in relation to the rate of travel of the reactants. The reaction zone temperature is much hotter, desirably above about 1400° C., preferably above about 1600° C., still more preferably above about 1800° C., more preferably from about 1800° C. to about 2200° C. and most preferably from about 1800° C. to about 2100° C. As the particles of the silica source and the carbon source enter the hotter reaction zone, they are rapidly heated and reacted.

At the increased temperature of the reaction zone, the reactants or components of the reactive mixture, e.g., silica and carbon, form silicon carbide. Because of the time increment required to ensure complete reaction, preferably from about 0.2 to about 10 seconds, the reaction zone is preferably elongated, and the reactant particle size and constituent intimacy, entraining gas flow rate, length of the reaction zone, and reaction zone temperature are preferably suitable for ensuring completion of the desired reaction.

Having formed the desired product, the entraining gas and any product aerosol, i.e., product particles and any volatile materials such as gaseous silicon monoxide and gaseous carbon monoxide, are then introduced directly into the cooling chamber 42, which is preferably expanded, as described above. This expanded cooling chamber 42 is preferably maintained at a temperature below about 350° C. to rapidly cool the product. The cooling chamber 42 is more preferably below about 100° C., and most preferably below about 50° C. Upon reaching the cooling zone 44, the reaction is effectively stopped. The cooling chamber's preferred expanded configuration, as described above, in which the cooling chamber diameter is larger than the diameter of the cooling inlet and, preferably, also larger than the diameter of the reactor or reaction chamber, serves two main purposes. First, it allows for adiabatic cooling, as well as radiative cooling effected by a water jacket or similar cooling means, and thus substantially increases the cooling rate. Second, it helps to eliminate adherence of significant quantities of unreacted liquid reactants, e.g., silicon monoxide, to the walls of the cooling chamber 42, by permitting recrystallization in space prior to wall contact. Plugging problems are thus reduced or eliminated because any unreacted silicon monoxide is discouraged from depositing on the walls of the cooling chamber 42 or at the cooling inlet 46. This helps to ensure continuous operation at this point in the reactor.

Finally, the product can preferably be collected after it has passed through the cooling zone 44. For this purpose, a cyclone or other collection means (not shown), e.g., a filter arrangement of some type, can be used.

The resulting silicon carbide powder preferably shows substantial uniformity of constituent crystal shape and diameter. The powder, particularly after removal of at least a portion of excess or unreacted carbon and oxygen, preferably comprises at least about 25 percent by weight beta-type silicon carbide crystals, more preferably at least about 75 percent, and most preferably at least about 90 percent. At least about 25 percent, more preferably at least about 75 percent, and most preferably at least about 90 percent of these crystals are preferably in the range of less than about 5 micrometers, more preferably less than about 2 micrometers, still more preferably less than about 1 micrometer in size. It is still more preferred that at least about 50 percent are in the size range from about 0.1 to about 0.4 micrometers, and it is most preferred that that at least about 80 percent are in this size range. A particularly preferred silicon carbide powder contains, after removal of at least a portion of excess or unreacted carbon and oxygen, at least 80 weight percent of silicon carbide crystals which have a mean Martin's diameter of less than 0.25 micrometer and a size distribution sufficient to provide a coefficient of variation of 0.6 or less. The mean Martin's diameter is most preferably within a range of 0.06 to 0.18 micrometer. The coefficient of variation is most preferably within a range of 0.1 to 0.6. This final product powder can be made very pure, and is preferably at least about 80 weight percent stoichiometric silicon carbide, more preferably at least about 90 weight percent, and most preferably at least about 95 percent. It may, in some instances, contain small amounts of unreacted carbon, which can be burned out of the product in oxygen, air, steam or carbon dioxide. It may also contain very small amounts of unreacted silica, which can be dissolved with hydrofluoric acid and then removed by washing. The procedures for these aftertreatments are described hereinabove.

Densification methods, known to those skilled in the art, can be used to densify or consolidate the ceramic powders of one embodiment of the present invention to form the densified parts of another embodiment. The uniformity of crystal size and configuration attainable through preparing silicon carbide powder by the method of the present invention can enable production of a fine-grained product of theoretical or near-theoretical density with minimal void spaces. The void spaces can, in turn, have a detrimental effect on various physical properties of the densified products, such as strength. Because extensive milling operations of the powder prior to densification are not needed, substantial cost and time reductions can be achieved. The purity level of the powder as produced, e.g., without milling, also reduces potential degradation of properties caused by significant impurity levels.

In addition to manipulation of reactants to achieve the desired product size or configuration, it is also possible to adjust other reaction variables. These variables include: (1) the temperatures of the reactant transport member, reaction zone, and cooling zone; (2) the flow rate of the sweep and entrainment gases and therefore of the reactants; (3) the reaction zone cross-sectional dimension or dimensions and length; (4) the relationship of the diameters of the cooling chamber and the cooling inlet; and (5) the temperature of sweep, entrainment and by-product gases within the reaction chamber. The quantity of by-product gases generated in the reaction should, in some cases, be taken into account in making these adjustments, since it will affect flow rates. For most reactions the residence time is preferably from about 0.2 to about 10 seconds, but longer or shorter times can also be employed.

The following examples are given to more fully illustrate the present invention. They are intended to be, and should be construed as being, illustrative only and are not limitative of the scope of the invention. All parts and percentages are by weight unless otherwise specified.

EXAMPLE 1

Silicon Carbide Prepared at 1900° C. under Argon

Reactive mixture preparation:

About 3.60 kg of acetylene carbon black and 16.95 kg of a colloidal silica slurry, at a solids concentration of 35.37 percent and a pH of 3, are admixed with about 0.36 liter of TRITON X-100* dispersant, which is alkyl phenoxy polyethoxy ethanol, and 45.5 liters of deionized water. Mixing is done in a plastic-lined container using a stainless steel impeller. The slurry, having a stoichiometric molar carbon to silica ratio of 3.0, is mixed under high agitation for about 3 hours.

*TRITON X-100 is a trademark of Rohm & Haas Co.

The resulting mixture is then spray-dried in a spray dryer unit. The slurry is fed into the spray dryer at a rate of from 40 to 50 kg/hr under a drying air stream of about 505 kg/hr. Inlet and outlet temperatures are kept at 300° C. and 110° C., respectively, and the dried powder is collected in the drying chamber and a downstream cyclone.

The product obtained is in the form of a black powder having approximately 4 percent moisture content. This material shows a median particle size of approximately 25 micrometers and is very free-flowing. About 90 percent of this reactive mixture powder has a particle size of less than 48 micrometers; about 50 percent is less than 23 micrometers; and about 10 percent is less than about 8.8 micrometers. Examination of the powder by a scanning electron microscope shows a spherical morphology with fine silica particles being dispersed in a carbon matrix.

The spray dried carbon/silica reactive mixture is dehydrated in a tray oven at 400° C. for 12 hours. A thermogravimetric analysis shows the final product to be an intimate and finely divided reactive mixture composition containing 0.3 weight percent hydrated water.

Silicon Carbide Preparation:

Some of the dehydrated reactive mixture is loaded into a feed hopper and purged with argon gas for 30 minutes.

A 4.5 inch inside diameter×3.3 foot long (11.43 cm inside diameter×1 m long) vertical graphite tube furnace is brought to a temperature of 1900° C. as measured via an optical pyrometer. The intimate and finely divided particulate reactive mixture is fed into the vertical furnace via a reactant transport member at the rate of 0.33 kg/hour. Argon flows through the reactant transport member at the rate of 21.52 standard liters per minute, thus sweeping the particulate reactive mixture with it. After 30 minutes, product is collected from a downstream baghouse and analyzed chemically.

Carbon content is determined via a combustion analysis as 29.32 weight percent carbon. There is also present 3.68 weight percent oxygen. The product is therefore calculated to be at least about 91 weight percent silicon carbide, assuming that all oxygen present is in the form of unreacted silicon dioxide, of at least about 87 percent, assuming all oxygen present is in the form of silicon monoxide.

Figure 3:
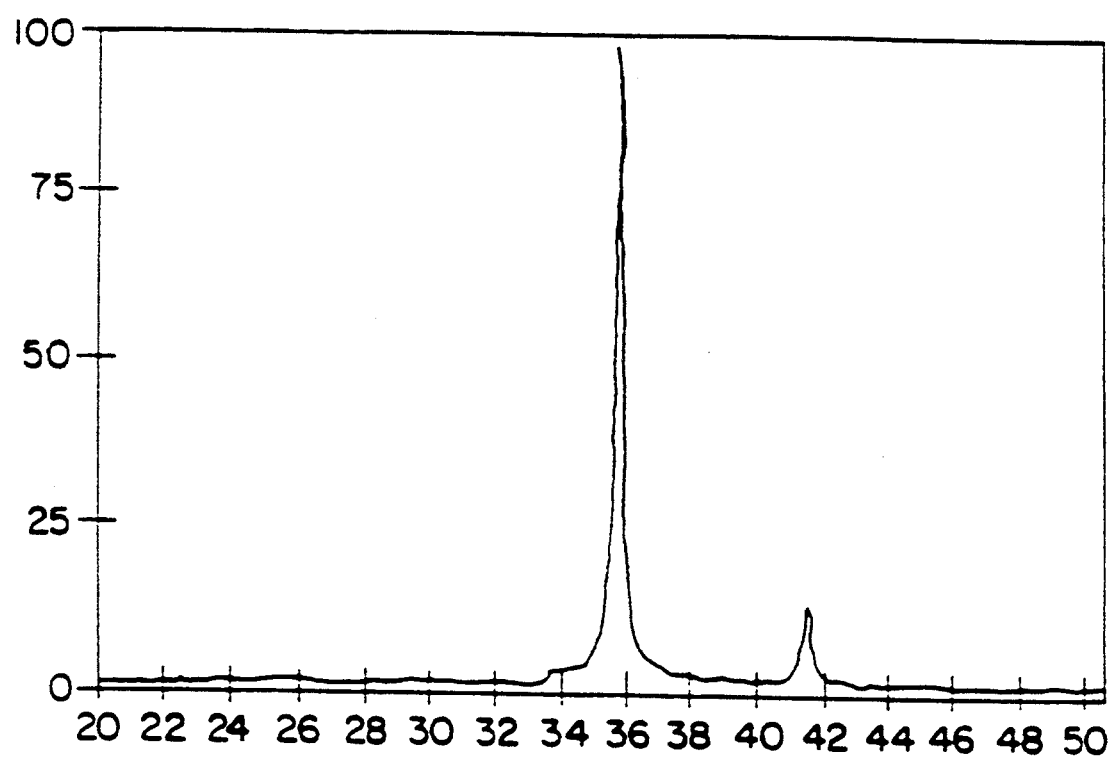
FIG. 3 is an X-ray diffraction pattern of silicon carbide powder prepared according to the method of one embodiment of the present invention.

An X-ray diffraction pattern of the product indicates that the powder is at least about 90 percent by weight primarily beta silicon carbide with a minor amount of alpha silicon carbide present. (See FIG. 3.) No free carbon or silica is detected in the X-ray pattern.

Figure 4:
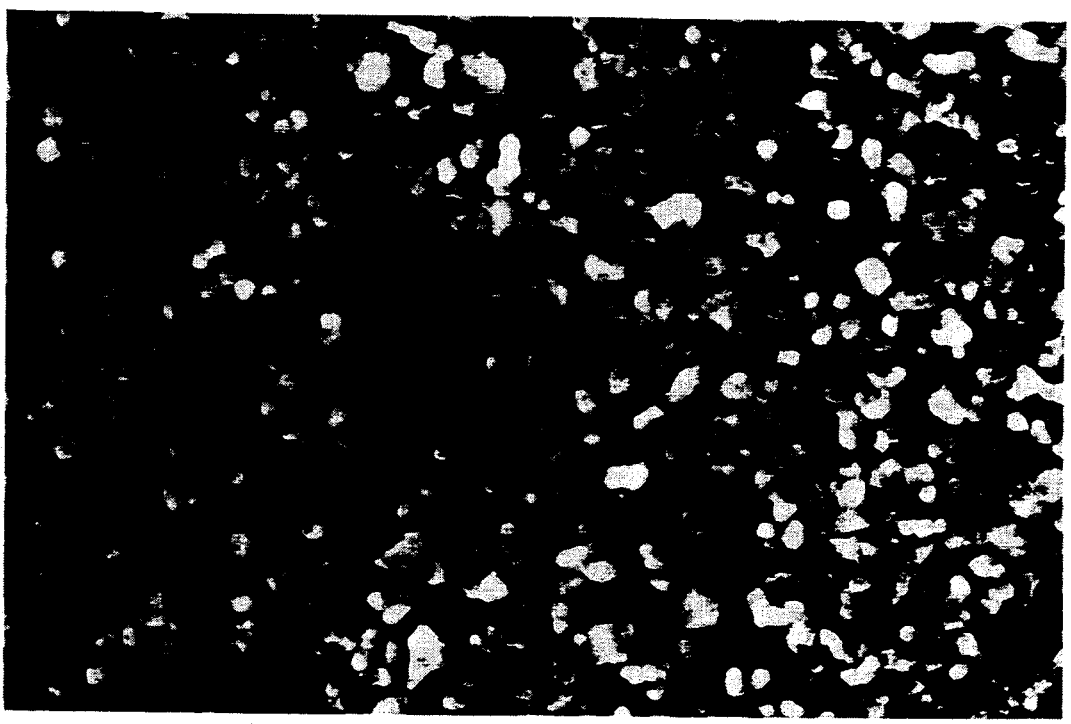
FIG. 4 is a drawing of a scanning electron micrograph of silicon carbide powder prepared according to the method of one embodiment of the present invention.

A scanning electron micrograph indicates that the powder is comprised primarily of uniform crystals of approximately 0.1 to 0.5 micrometer diameter. (See FIG. 4) Individual crystals from a representative transmission electron micrograph (TEM) are counted and a median crystal size of 0.19 micrometer with 0.05 micrometer standard deviation is determined, i.e., more than 50 percent of the crystals fall within a range of from 0.14 to 0.24 micrometers, which is also a range from about 0.7 times the median crystals size to about 1.3 times the median crystal size. More than 80 percent fall within a range from about 0.1 to 0.3 micrometers. The aggregate surface area, without milling, is about 18 $m^2/g$ as determined by Brunauer-Emmett-Teller (BET) analysis, which is a nitrogen physisorption analysis. The chemical composition of individual crystals is determined by an electron diffraction microprobe to be silicon carbide.

EXAMPLE 2

Silicon Carbide Prepared at 2000° C. under Argon:

A particulate reactive mixture, prepared as described in Example 1, is loaded into a feed hopper and purged with argon gas for 30 minutes. A 4.5 inch inside diameter×3.3 foot long (11.43 cm inside diameter×1 m long) vertical graphite tube furnace is brought to a temperature of 2000° C. as measured via an optical pyrometer. The intimate and finely divided particulate reactive mixture is fed into the vertical furnace via a water-cooled reactant transport member at a rate of 0.33 kg/hour. Argon flows through the reactant transport member at a rate of 21.52 standard liters per minute, sweeping the particulate reactive mixture with it. After 30 minutes, product is collected from a downstream baghouse and analyzed chemically.

Carbon content is determined via a combustion analysis as 29.50 weight percent carbon. There is also present 2.94 weight percent oxygen. The product is therefore calculated to be at least about 93 weight percent silicon carbide, assuming that all oxygen present is in the form of unreacted silicon dioxide, or at least about 89 weight percent, assuming all oxygen present is in the form of silicon monoxide.

An X-ray diffraction pattern of the product indicates that the powder is at least about 75 percent by weight beta silicon carbide with some alpha silicon carbide present. No free carbon or silica is detected in the X-ray pattern.

A scanning electron micrograph indicates that the powder is comprised primarily of uniform, crystals of approximately 0.1 to 0.5 micrometer diameter. Individual crystals from a representative transmission electron micrograph are counted and a median crystal size of 0.27 micrometer with 0.14 micrometer standard deviation is determined, i.e., at least 50 percent by weight fall within a range of from 0.1 to 0.4 micrometers, and also within a range from 0.4 times the median particle size to 1.5 times the median particle size. The chemical composition of individual crystals is determined by an electron diffraction microprobe to be silicon carbide.

EXAMPLE 3

SiC Prepared at 2100° C. under Argon:

A reactive mixture, prepared as described in Example 1, is loaded into a feed hopper and purged with argon gas for 30 minutes. A 4.5 inch inside diameter×3.3 foot long (11.43 cm inside diameter×1 m long) vertical graphite tube furnace is brought to a temperature of 2100° C. as measured via an optical pyrometer. The intimate and finely divided particulate reactive mixture is fed into the vertical furnace via a water-cooled reactant transport member at a rate of 0.33 kg/hour. Argon flows through the reactant transport member at the rate of 21.52 standard liters per minute, sweeping the particulate reactive mixture with it. After 30 minutes, product is collected from a downstream baghouse and analyzed chemically.

Carbon content is determined via a combustion analysis as 31.74 weight percent carbon. There is also present 2.87 weight percent oxygen. The product is therefore calculated to be at least about 89 weight percent silicon carbide, assuming that all oxygen present is in the form of unreacted silicon dioxide, or at least about 86 weight percent, assuming that all oxygen present is in the form of silicon monoxide.

An X-ray diffraction pattern of the product indicates that the powder is primarily beta silicon carbide with some alpha silicon carbide present. No free carbon or silica is detected in the X-ray pattern.

A scanning electron micrograph indicates that the powder is comprised primarily of uniform, approximately 0.1 to 0.7 micrometer diameter crystals. Individual crystals from a representative TEM are counted and a median crystal size of 0.40 micrometer with 0.19 micrometer standard deviation is determined, i.e., more than 50 percent of the crystals fall within a range of from about 0.21 to 0.59 micrometers, and also within a range of from 0.5 to 1.5 times the median particle size.

The chemical composition of individual crystals is determined by an electron diffraction microprobe to be silicon carbide.

EXAMPLE 4

Silicon Carbide Prepared at 2100° C. under Argon:

Reactive Mixture Preparation:

About 1.8 liters of the TRITON X-100* dispersant used in Example 1, 450 milliliters (ml) of ammonium hydroxide and 350 ml of a silicone compound commercially available from Dow Corning Corporation under the trade designation ANTIFOAM B ™ are admixed with 288 pounds (130.8 kg) of deionized water in a 55 gallon (208.2 liter) plastic drum. After mixing for ten minutes with a stainless steel impeller as in Example 1, 25 pounds (11.4 kg) of acetylene carbon black are added, while mixing continues, using a DISPERSATOR* 3000 (*DISPERSATOR* 3000 is a trademark of Premier Mill) to form a slurry. The slurry is mixed under high agitation for about one hour or until no visible agglomerates are apparent. About 95.6 pounds (43.4 kg) of colloidal silica commercially available from P. Q. Corporation under the trade designation NYACOL ™ 2040NH4 (analyzed as 37.93 weight percent 20 nm silica in water) is added to the slurry which is then mixed under high agitation for an additional hour.
*DISPERSATOR* 3000 is a trademark of Premier Mill The resulting slurry is spray dried as in Example 1, save for increasing the outlet temperature to 130° C., to provide a spray dried powder. The spray dried powder is collected and dehydrated in an inert gas oven (with flowing gaseous nitrogen) for ten hours at 400° C. to remove the dispersant and chemically bound water associated with the colloidal silica.

The dehydrated powder has an average particle size, as determined using a single powder counter commercially available from Pacific Scientific under the trade designation HIAC, of about 43 micrometers. Carbon content, determined as in Example 1, is 39.2 weight percent indicating a carbon to silica molar ratio of 3.2.

Silicon Carbide Preparation:

Some of the dehydrated powder is loaded into a feed hopper and purged with argon gas as in Example 1.

A six inch inside diameter×eleven foot long (15.2 cm inside diameter×3.4 m long) vertical graphite tube furnace is brought to a temperature of 2100° C. as measured by optical pyrometers viewing the outside wall of the reaction chamber. The dehydrated powder is fed into the vertical furnace at a rate of 0.2 pound/minute (0.09 kg/minute) via a twin screw loss-in-weight feeder through a water cooled cold finger maintained at a temperature of 22° C. Argon gas flows into the top of the furnace at a rate of four SCFM (113.3 standard liters per minute) (three SCFM entrainment gas and one SCFM sweep gas), thus sweeping the dehydrated powder with it.

A sample of product powder is collected after reaching a steady state condition via an in-line sampling device below the furnace's cooling zone. An X-ray diffraction pattern of the product, as in Example 1, indicates that the silicon carbide content of the powder is at least 90 weight percent beta silicon carbide with a minor amount of alpha silicon carbide present. Chemical analysis as in Example 1 shows a carbon content of 31.7 weight percent and an oxygen content of 7.0 weight percent, thereby indicating a silica conversion of about 89.9 percent. The remainder of the product powder is collected by a device such as a cyclone or a bag filter.

Product Powder Post Treatment and Analysis:

A sample of the product powder is placed in a quartz boat within a tube furnace. Air is passed over the boat and the tube furnace temperature is raised to a temperature of 630° C. and maintained at that temperature for sixteen hours to burn out unreacted residual carbon. The furnace is then cooled and the boat and treated powder are removed from the furnace.

The treated powder is placed in a graphite crucible within a high temperature graphite furnace. Argon gas is passed over the crucible and the furnace temperature is raised to a temperature of 1450° C. and maintained at that temperature for four and one-half hours to remove unreacted or residual silicon oxides from the product powder (SiC).

Chemical analysis of the treated SiC powder after silicon oxide removal reveals a carbon content of 28.5 weight percent and an oxygen content of 1.9 weight percent thereby indicating a silicon carbide content of greater than 96.4 weight percent, assuming all oxygen present is in the form of silicon monoxide. As noted in the preceding examples, the silicon carbide content is even higher if all oxygen is in the form of silicon dioxide. The treated SiC powder has a BET surface area, without milling, of 13.1 m²/g.

Some of the treated SiC powder is sonicated to disperse the crystals and analyzed by transmission electron microscopy. Martin's diameter is measured for 529 particles and the particle size distribution is determined from digitized statistical analysis of the diameters. The mean Martin's diameter is 0.121 micrometer with a standard deviation of 0.046 micrometer. The Martin's diameter ranges from 0.02 to 0.32 micrometer. This corresponds to a coefficient of variation of 0.38.

EXAMPLES 5–8

Replication of Example 4 at Various Temperatures:

The procedure of Example 4 is replicated at various temperatures. The temperatures and analytical results for Examples 5–8 are shown together with their counterparts from Example 4 in Table I. FIG. 9 graphically displays the relationship between temperature and mean Martin's diameter of the resultant silicon carbide crystals. The silicon carbide contents shown in Table I are, as in Example 4, based upon the assumption that all oxygen present is in the form of silicon monoxide.

TABLE I

Chemical and Physical Analysis of SiC Powders Synthesized from Acetylene Carbon Containing Precursors

| Temp. (°C.) | 1800 | 1900 | 2000 | 2100 | 2200 |
|---|---|---|---|---|---|
| Reaction Time (seconds) | 3.3 | 2.7 | 2.6 | 2.5 | 2.3 |
| Silica Source Size (μm) | 0.02 | 0.02 | 0.02 | 0.02 | 0.02 |
| Raw SiC Product | | | | | |
| Wt. % C | 38.1 | 34.8 | 33.2 | 31.7 | 32.2 |
| Wt. % O | 22.2 | 6.1 | 5.0 | 7.0 | 4.0 |
| Post-Treated SiC Product | | | | | |
| Wt. % C | — | 30.9 | 28.9 | 28.5 | 28.9 |
| Wt. % O | — | 0.9 | 1.1 | 1.3 | 0.6 |
| Wt. % SiC | — | >95.0 | >96.9 | >96.4 | >98.3 |
| Crystal Size (μm) | | | | | |
| Mean | 0.067 | 0.085 | 0.101 | 0.121 | 0.168 |
| Standard Deviation | 0.039 | 0.029 | 0.034 | 0.046 | 0.056 |
| Range (μm) | 0.01–0.43 | 0.03–0.28 | 0.03–0.28 | 0.02–0.32 | 0.03–0.34 |
| Coefficient of Variation | 0.58 | 0.34 | 0.34 | 0.38 | 0.33 |
| Particles Counted | 821 | 668 | 503 | 529 | 291 |
| Surface Area (m²/g) (BET) | — | 14.2 | 13.8 | 13.1 | 6.6 |

— not measured

Figure 5:
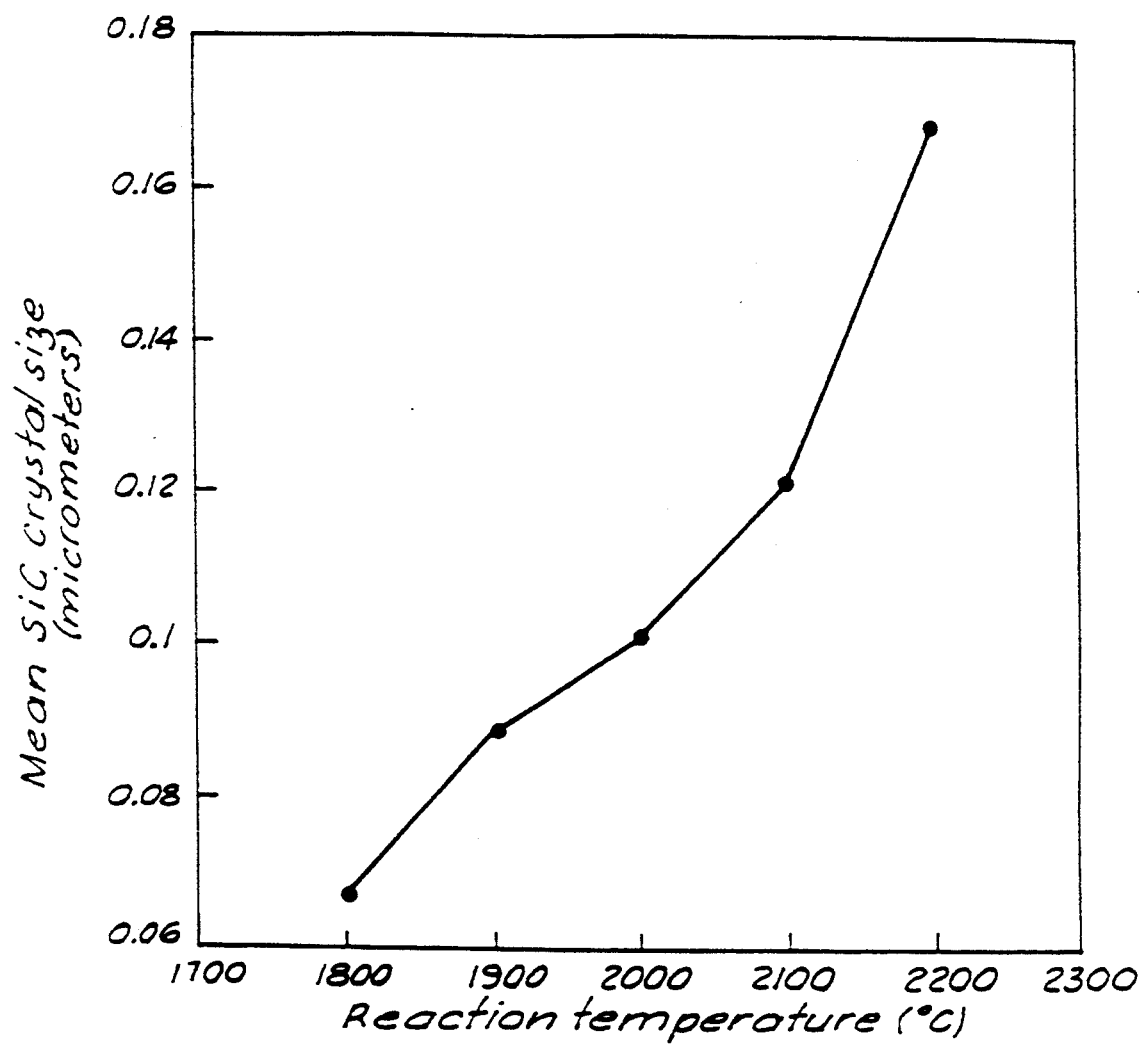
FIG. 5 is a graphic portrayal contrasting reaction temperature and resultant silicon carbide crystal size for Examples 4–8.

The data contained in Table I and graphically displayed in FIG. 5 show that an increase in reaction temperature results in a corresponding increase in silicon carbide crystal size as well as a decrease in BET surface area. This suggests that ultimate silicon carbide crystal size and size distribution can be tailored by varying the reaction temperature. Similar results are expected with other reactive mixtures and process variations, all of which are described herein.

EXAMPLE 9

Silicon Carbide Prepared at 1900° C. With Increased Residence Time

The procedures of Example 6 are duplicated save for removing the product powder from the collection device and passed through the vertical furnace a second time before post treatment and analysis. The mean Martin's diameter is 0.121 micrometer with a standard deviation of 0.049 micrometer and a range of 0.03 to 0.29 micrometer. This corresponds to a coefficient of variation of 0.4.

A comparison of the mean Martin's diameter of the silicon carbide crystals of Example 6 with that of Example 9 shows an increase in diameter of about 42 percent due to increasing the reaction or residence time from 2.7 seconds (Example 6) to 6.5 seconds (Example 9). This data suggests that reaction time is also a suitable parameter for tailoring the ultimate silicon carbide crystal size. Similar results are expected with other reactive mixtures and process variations, all of which are described herein.

EXAMPLE 10

Silicon Carbide Prepared at 2100° C. With Increased Silica Particle Size

The procedure of Example 4 is modified by preparing a silica slurry in a second 55 gallon (208.2 liter) plastic drum. The silica slurry is added to the carbon black slurry in place of the colloidal silica used in Example 4.

About 25 ml of ammonium hydroxide and 40 ml of aqueous ammonium polymethacrylate, commercially available from R. T. Vanderbilt under the trade designation DARVAN TM C. are added to 21 pounds (9.5 kg) of deionized water to form a starting solution. About 31.2 pounds (14.2 kg) of 1.1 micrometer mean particle size natural crystalline silica commercially available from U.S. Silica Company under the trade designation MINUSIL-5 TM and 10.6 pounds (4.8 kg) of the same colloidal silica as used in Example 4 are added while mixing to the starting solution to form a silica slurry. The colloidal silica is added both as a binder and a source of silica. The silica slurry is mixed under high agitation until no visible agglomerates are apparent. The silica content of the slurry is about 88 weight percent of the 1.1 micrometer silica.

The resultant silicon carbide product is post treated and analyzed as in Example 4. Chemical analysis of the post treated powder shows a carbon content of 29.5 weight percent and an oxygen content of 1.0 weight percent, indicating that the product has a silicon carbide content of greater than 96.7 weight percent, assuming all oxygen present is in the form of silicon monoxide. The mean Martin's diameter (480 particles) is 0.133 micrometer with a standard deviation of 0.045 micrometer and a range of 0.04 to 0.33 micrometer. The coefficient of variation is 0.34. The BET surface area is 6.9 $m^2/g$.

The data presented in Example 10, when compared to that of Example 4, show that silica particle size does not influence resultant silicon carbide crystal size to the same degree as reaction time and temperature. A greater than fifty-fold increase in silica particle size (Example 4 versus Example 10) still allows production of satisfactory silicon carbide. If a greater BET surface area is needed, varying other parameters, particularly reaction temperature, should bring about the desired result. Similar results are expected with other reactive mixtures and process variations, all of which are described herein.

EXAMPLES 11-15

Silicon Carbide Prepared at 2100° C. With Different Sources of Carbon

The procedure of Example 4 is replicated using other sources of carbon. The sources of carbon are summarized in Table II. The chemical impurity levels and certain physical properties for the sources of carbon are summarized in Table III. The oxygen and carbon contents are determined by combustion analysis using, respectively, a LECO TC-436 analyzer and a LECO IR-412 analyzer. Certain physical properties of silicon carbide crystals prepared with the the various carbon sources are tabulated in Table IV and graphically portrayed in FIG. 6. The silicon carbide contents shown in Table IV are, as in the preceding examples, based upon the assumption that all oxygen present is in the form of silicon monoxide.

TABLE II

| Legend | Carbon Source Source |
|---|---|
| A | Commercially available from Cabot Corp. under the trade designation ELFTEX TM 8 |
| B | Commercially available from Cabot Corp. under the trade designation REGAL TM 330R |
| C | Acetylene carbon black commercially available from Chevron Chemical under the trade designation SHAWINIGAN TM |
| D | Commercially available from Cabot Corp. under the trade designation MONARCH TM 800 |
| E | Commercially available from Cabot Corp. under the trade designation MONARCH TM 120 |
| F | Commercially available from General Carbon Company under the trade designation Lampblack #3 |

TABLE IIIA

Chemical Analysis of Starting Carbon Powders

| Element*/ Carbon Source | A | B | C | D | E | F |
|---|---|---|---|---|---|---|
| Cl | 200 | 370 | <10 | 340 | 65 | 26 |
| P | <10 | <10 | <10 | <10 | <10 | <10 |
| Si | 125 | 155 | <10 | 80 | 16 | <10 |
| S | 0.98% | 1.05% | <10 | 1.33% | 1.67% | 1.00% |
| Al | 112 | 117 | <10 | 34 | 32 | 50 |
| Ca | 380 | 260 | <10 | 210 | 155 | <10 |
| Ti | <10 | <10 | <10 | <10 | <10 | <10 |
| Fe | 11 | 12 | 12 | 18 | 40 | 39 |
| Cu | <10 | <10 | <10 | <10 | <10 | <10 |
| Na | 490 | 570 | <200 | 400 | 340 | 235 |
| K | 38 | 450 | <10 | 340 | 100 | <10 |
| Mg | 114 | 110 | <10 | <100 | <100 | <100 |
| Cr | <10 | <10 | <10 | <10 | <10 | <10 |
| Ni | <10 | <10 | <10 | <10 | <10 | <10 |
| Zn | <10 | <10 | <10 | <10 | <10 | <10 |
| Wt. % C | 96.7 | 97.5 | 98.6 | 94.2 | 96.0 | 92.0 |
| Wt. % O | 1.2 | 1.5 | 0.3 | 3.3 | 0.6 | 6.0 |

*Concentrations (ppm) unless otherwise indicated (± 5% relative error)

TABLE IIIB (Martin's Diameter and Surface Area of Starting Carbon Crystals)

| Property/ Carbon Source | A | B | C | D | E | F |
|---|---|---|---|---|---|---|
| Mean (μm) | 0.035 | 0.030 | 0.030 | 0.019 | 0.056 | 0.079 |
| Standard Deviation | 0.011 | 0.010 | 0.010 | 0.006 | 0.024 | 0.037 |
| Median (μm) | 0.034 | 0.029 | 0.029 | 0.019 | 0.054 | 0.072 |
| Range (μm) | 0.014–0.009 | 0.012–0.07 | 0.009–0.08 | 0.0002–0.04 | 0.013–0.16 | 0.023–0.36 |
| Particles Counted | 493 | 780 | 275 | 1097 | 415 | 673 |
| Surface Area ($m^2/g$) (BET) | 70 | 94 | 72 | 210 | 25 | 27 |

TABLE IV

Chemical and Physical Analysis of SiC Powders Synthesized from Non-Acetylene Carbon Containing Precursors

| Property/ Example | 11 | 12 | 13 | 14 | 15 |
|---|---|---|---|---|---|
| Carbon Source | D | E | F | B | A |
| Reaction Time (s) | 1.7 | 1.8 | 1.7 | 1.8 | 1.8 |
| Raw SiC Product | | | | | |
| Wt. % C | 37.5 | 32.7 | 35.5 | 35.2 | 36.9 |
| Wt. % O | 11.2 | 4.0 | 11.4 | 8.8 | 11.6 |
| Post-Treated SiC Product | | | | | |
| Wt. % C | 27.0 | 30.0 | 30.0 | 30.0 | 30.0 |
| Wt. % O | 4.2 | 0.8 | 0.5 | 0.5 | 0.6 |
| Wt. % SiC | >87.6 | >96.7 | >97.9 | >97.9 | >97.5 |
| Crystal Size (μm) | | | | | |
| Mean | 0.116 | 0.137 | 0.156 | 0.164 | 0.166 |
| Standard Deviation | 0.045 | 0.048 | 0.047 | 0.069 | 0.045 |
| Range (μm) | 0.03–0.33 | 0.02–0.39 | 0.05–0.41 | 0.04–0.43 | 0.06–0.33 |
| Coefficient of Variation | 0.39 | 0.35 | 0.30 | 0.42 | 0.27 |
| Particles Counted | 545 | 758 | 291 | 310 | 293 |
| Surface Area | 9.5 | 6.9 | 6.4 | 5.8 | 6.6 |

TABLE IV-continued

Chemical and Physical Analysis of SiC Powders Synthesized from Non-Acetylene Carbon Containing Precursors

| Property/Example | 11 | 12 | 13 | 14 | 15 |
|---|---|---|---|---|---|
| ($m^2/g$) (BET) | | | | | |

Figure 6:
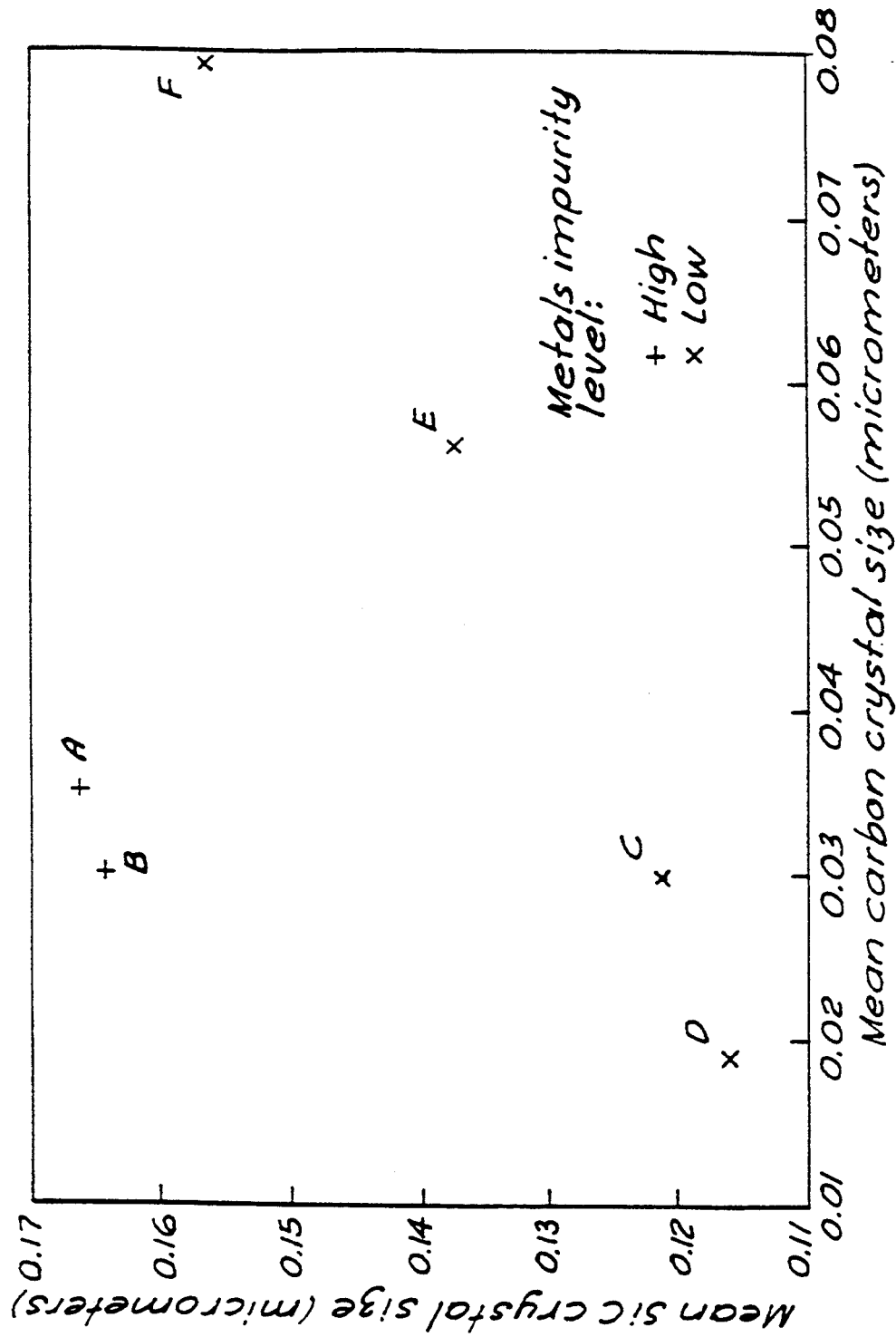
FIG. 6 is a graphic portrayal contrasting mean crystal size and purity of the carbon starting material with the resultant silicon carbide crystal size for Examples 4 and 11–15.

The data presented in Table IV and graphically portrayed in FIG. 6 clearly demonstrate, particularly when contrasted with corresponding data from Example 4, the effect of the purity and particle size of the carbon source upon characteristics of the resultant silicon carbide crystals. In general, a low impurity level, such as that evident in acetylene carbon black (Example 4 and Table II, Carbon Source C), results in a smaller silicon carbide crystal with a greater BET surface area than a relatively high impurity level (Table II, Carbon Sources A and B corresponding respectively to Examples 15 and 14). In addition, a smaller carbon size generally results in a smaller silicon carbide crystal size as evidenced by comparing Examples 11 and 12. In addition, a starting carbon with both high purity and small particle size (Example 4) provides silicon carbide crystals with a greater BET surface area than can be obtained with a starting carbon having either a higher metal impurity level or a larger particle size. Similar results are expected with other reactive mixtures and process variations, all of which are described herein.

What is claimed is:

1. A process for preparing silicon carbide by carbothermal reduction which comprises passing a particulate reactive mixture of a silica source and a carbon source through a heating zone such that substantially all of the particles of the reactive mixture are individually heated at a heating rate of at least about 100° C./second to a temperature within a range of from 1400° C. to 2400° C. and maintained within that range for a time period of from 0.2 to 10 seconds to form a product which, after removal of at least a portion of excess carbon and oxygen, is at least 80 weight percent silicon carbide crystals which have a size distribution such that at least 50 weight percent of the silicon carbide crystals is from 0.4 to 1.6 times the median crystal size.

2. The process of claim 1 wherein the silica source and carbon source are present in the reactive mixture in a carbon to silica mole ratio of less than 3.5.

3. The process of claim 1 wherein the silica source and carbon source are present in the reactive mixture in a carbon to silica mole ratio of from 3.0 to less than 3.2.

4. The process of claim 1 wherein the carbon source is carbon black, acetylene carbon black, a vinylidene chloride polymer, a hydrocarbon, a carbohydrate, or a mixture thereof, the carbon source being calcined either before or after it is mixed with the silica source, and the silica source is amorphous granular silica, fumed silica, aqueous colloidal silica, silica gel, precipitated silica, or a mixture thereof.

5. The process of claim 1 wherein the heating rate of reactive mixture particles is from 100° C./second to 100,000° C./second.

6. The process of claim 1 wherein at least 50 weight percent of the silicon carbide crystals is from 0.1 to 0.4 micrometer in diameter.

7. The process of claim 1 wherein at least 25 percent by weight of the silicon carbide crystals is beta silicon carbide.

8. The process of claim 1 wherein the carbon source, the temperature and the time period are sufficient to result in silicon carbide crystals having a mean Martin's diameter of less than 0.25 micrometer and a size distribution sufficient to provide a coefficient of variation of 0.6 or less.

9. The process of claim 8 wherein the carbon source consists essentially of carbon particles having a mean Martin's diameter of less than about 0.1 micrometer, the temperature is within a range of from 1800° C. to 2200° C., and the time period is from 0.2 to about five seconds.

10. The process of claim 9 wherein the mean Martin's diameter of the carbon particles is within a range of 0.02 to 0.08 micrometer inclusive.

11. The process of claim 8 wherein the coefficient of variation is within a range of 0.2 to 0.6 inclusive.

12. The process of claim 8 wherein the silicon carbide crystals have a mean Martin's diameter within a range of 0.06 to 0.18 micrometer inclusive.

13. The process of claim 8 wherein the carbon source is acetylene carbon black or another carbon source having a level of metal impurities no greater than that of acetylene carbon black.

14. The process of claim 13 wherein the silicon carbide crystals have an unmilled BET surface area of 18 square meters per gram or less.

15. The process of claim 14 wherein the BET surface area is within a range of from 12 to 18 square meters per gram.

16. A process for preparing silicon carbide crystals by carbothermal reduction which comprises:

(1) passing a particulate reactive mixture of a silica source and a carbon source into a reactor having
  (a) a reactant transport member, the reactant transport member having a wall defining a hollow conduit, the wall having a cooling means and being further characterized as having a concentric inner wall defining an inner annular space, the inner annular space having an inlet and being open at the bottom such that a gas can be flowed therethrough;
  (b) a reactor chamber, the reactor chamber having a wall defining a reaction zone, the chamber being in fluid communication with the reactant transport member:
  (c) a heating means, the heating means being suitable for heating the particulate reactive mixture in the reaction zone; and
  (d) a cooling chamber, the cooling chamber having a wall defining a cooling zone, the wall having a cooling means, the cooling chamber being in fluid communication with the reactor chamber;
  the temperatures of the reactant transport member, reactor chamber, and cooling chamber being independently controllable:
  such that the particulate reactive mixture can be fed continuously through the reactant transport member into the reactor zone and then into the cooling zone;

(2) heating the silica source and the carbon source in the reaction zone at a heating rate of at least about 100° C./second to a temperature from 1400° C. to 2400° C. to form a product aerosol; and (3) cooling the product aerosol in the cooling zone to form a product which, after removal of at least a portion of excess carbon and oxygen, is at least 80 weight percent silicon carbide crystals which have a size distribution such that at least 50 weight percent of the silicon carbide crystals is from 0.4 to 1.6 times the median crystal size.

17. The process of claim 16 wherein fluid communication between the reactor chamber and the cooling chamber is accomplished by means of a cooling inlet, the cooling chamber being configured such that its diameter is larger than the diameter of the cooling inlet.

18. A composition which, after removal of at least a portion of excess carbon and oxygen, comprises at least 80 weight percent silicon carbide crystals having a size distribution such that at least 80 weight percent of the silicon carbide crystals is from 0.1 to 0.4 micrometer in size and at least 50 percent of the silicon carbide crystals is from 0.4 to 1.6 times the median crystal size.

19. A process for producing silicon carbide by carbothermal reduction comprising passing a particulate reactive mixture of a silica source and a carbon source through a heating zone such that substantially all of the particles of the reactive mixture are individually heated at a heating rate of at least about 100° C./second to a sufficient temperature and for a sufficient length of time to form a product which, after removal of at least a portion of excess carbon and oxygen, is at least about 80 weight percent silicon carbide crystals which have a size distribution such that at least about 50 weight percent of the silicon carbide crystals is within a size range from about 0.4 to about 1.6 times the median crystal size.

20. The process of claim 19 wherein the silica source and carbon source are present in the reactive mixture in a carbon to silica molar ratio of less than 3.5.

21. The process of claim 19 wherein the silica source and carbon source are present in the reactive mixture in a carbon to silica molar ratio of from about 3.0 to less than 3.2.

22. The process of claim 19 wherein the carbon source is calcined, either before or after admixing with the silica source, and selected from the group consisting of carbon black, acetylene carbon black, a vinylidene chloride polymer, a hydrocarbon, a carbohydrate, and mixtures thereof, and the silica source is selected from the group consisting of amorphous granular silica, fumed silica, aqueous colloidal silica, silica gel, precipitated silica, and mixtures thereof.

23. The process of claim 19 wherein the temperature is from about 1400° C. to about 2400° C.

24. The process of claim 19 wherein at least about 50 percent by weight of the silicon carbide crystals are from about 0.1 to about 0.4 micrometer in diameter.

25. The process of claim 19 wherein at least about 25 percent by weight of the silicon carbide crystals is beta silicon carbide.

26. The process of claim 19 wherein the carbon source, the temperature and the time period are sufficient to result in silicon carbide crystals having a mean Martin's diameter of less than 0.25 micrometer and a size distribution sufficient to provide a coefficient of variation of 0.6 or less.

27. The process of claim 26 wherein the carbon source consists essentially of carbon particles having a mean Martin's diameter of less than about 0.1 micrometer, the temperature is within a range of from 1800° C. to 2200° C., and the time period is from 0.2 to about five seconds.

28. The process of claim 27 wherein the mean Martin's diameter of the carbon particles is within a range of 0.02 to 0.08 micrometer inclusive.

29. The process of claim 26 wherein the silicon carbide crystals have a mean Martin's diameter within a range of 0.06 to 0.18 micrometer inclusive.

30. The process of claim 26 wherein the carbon source is acetylene carbon black or another carbon source having a level of impurities no greater than that of acetylene carbon black.

31. The process of claim 30 wherein the silicon carbide crystals have an unmilled BET surface area of 30 square meters per gram or less.

32. The process of claim 30 wherein the BET surface area is within a range of from about 12 to about 18 square meters per gram.

* * * * *